July 21, 1959 — C. G. HOCKETT — 2,895,174
MANUFACTURE OF PLEATED FILTERS
Filed Jan. 10, 1957 — 3 Sheets-Sheet 1

INVENTOR.
CARL G. HOCKETT
BY
Charles C. Willson
ATTORNEY

July 21, 1959  C. G. HOCKETT  2,895,174
MANUFACTURE OF PLEATED FILTERS
Filed Jan. 10, 1957  3 Sheets-Sheet 2

INVENTOR.
CARL G. HOCKETT
BY
Charles C. Willson
ATTORNEY

July 21, 1959  C. G. HOCKETT  2,895,174
MANUFACTURE OF PLEATED FILTERS
Filed Jan. 10, 1957  3 Sheets-Sheet 3

INVENTOR.
CARL G. HOCKETT
BY
Charles E. Willson
ATTORNEY

400

United States Patent Office 2,895,174
Patented July 21, 1959

2,895,174

MANUFACTURE OF PLEATED FILTERS

Carl G. Hockett, Uxbridge, Mass., assignor to Fram Corporation, Providence, R.I., a corporation of Rhode Island Application January 10, 1957, Serial No. 633,408

6 Claims. (Cl. 18—59)

This invention relates to an improved method of manufacturing annular or elliptical pleated filters, such as pleated air filters for filtering the air supplied to the carburetors of internal combustion engines.

Many motor vehicles now being manufactured are equipped with pleated paper filters for filtering the air supplied to the engine carburetors. One form of such pleated paper filter which is now extensively used is shown, described and claimed in the Rabbitt et al. Patent No. 2,732,031. This filter, as shown and described in such patent, comprises a cylindrical inner screen around which is disposed a ring of pleated paper that forms the filter element, and around this pleated filter element is disposed an outer cylindrical screen. To each end of the annular pleated paper and screens is secured a plastic sealing cap molded to the desired shape. The zigzag ends of the pleated paper and ends of the annular screens are embedded in these plastic caps, and the plastic is then heated to cure the same. It is desired to point out that in some constructions one or both of the protecting screens are omitted, and the complete filter element may be elliptical in shape rather than annular.

The practice heretofore in manufacturing these annular pleated paper cartridges having an inner and outer protecting screen, has been to form the pleated paper element as a closed ring, and then introduce this pleated paper annulus between the inner and outer screen rings. While this method of assembling the filter parts works fairly well, it is difficult in mass production of these filters to control accurately the diameter of the metal screens, and if a slight variation occurs in the diameter of the metal screens, or in the width of the paper pleats, the parts may not fit and a defective filter cartridge may result.

The present invention contemplates a new method of retaining the pleated filter element accurately in the desired annular elliptical shape at the time the end caps are applied thereto. This method works well when the pleated paper alone is employed, and also when an inner screen or outer screen are both used with the pleated paper. In each construction, the present method insures that the end caps will be positioned concentrically with the other filter parts.

In carrying out the method of the present invention, a jig is employed having an upstanding cylindrical body or, if desired, an elliptical body, and a laterally extending base or flange. The diameter of the cylindrical body is such that when an inner screen is employed, it is given the form of a rectangular sheet and is laid around such body so that its ends overlap slightly. The screen is then caused to embrace this body closely, so that it will form an annular inner screen of the exact size desired. After the inner screen is placed in this manner about the jig body, the pleated paper annulus with its end pleats joined together is slipped over the inner screen. Next, the outer screen, if used, is placed about the pleated paper in the form of a rectangular sheet so that its ends overlap. A clamping band is then placed about the outer screen and is drawn tight about the same to cause all rings to embrace snugly the cylindrical body portion of the jig. In this manner the diameter of the inner screen, pleated paper cylinder, and outer screen are accurately controlled by the body of the jig. As a result, pleated paper filter cartridges that are highly uniform in shape and size, and having concentric end caps are produced.

One important advantage obtained by the present method is that it produces a firm, concentric assembly of screens and pleated paper, and holds the parts in this relation when the assembly is dipped into the liquid plastic. This plastic, when heat cured in a mold, forms a sealing end cap for the cartridge.

Another important advantage of the present method is obtained by using the above described jig having an annular body about which the inner screen, pleated paper, and outer screen are firmly held by a clamping band, which band serves to contract the inner screen, pleated paper annulus, and outer screen so that they will tightly embrace one another and avoid play between the parts.

Also, by employing the present method whereby the filter parts are held concentrically with the diameter of the mold body, it is possible to reduce the outer diameter of the mold cavity and still form an end cap having the outer screen, when used, uniformly embedded near the outer periphery of the plastic cap. This insures concentric end caps and results in a saving in the amount of plastic used.

By employing a jig such as herein contemplated, which has a cylindrical body and base flange, the pleated paper and screens when used, can be placed about such body in embracing relation therewith as above described. After this is done, the pleated paper ring and screens can be forced against such flange to seat firmly thereupon. This serves to position such ends in proper relation to one another.

By employing the present method, the filter units can be easily and quickly assembled with the parts in proper relation to each other and the end discs concentrically secured thereto, so that very few defective cartridges are likely to be produced.

The above and other features of the present invention and method of carrying out the same will be further understood from the following description when read in connection with the accompanying drawings, wherein.

Figure 5:
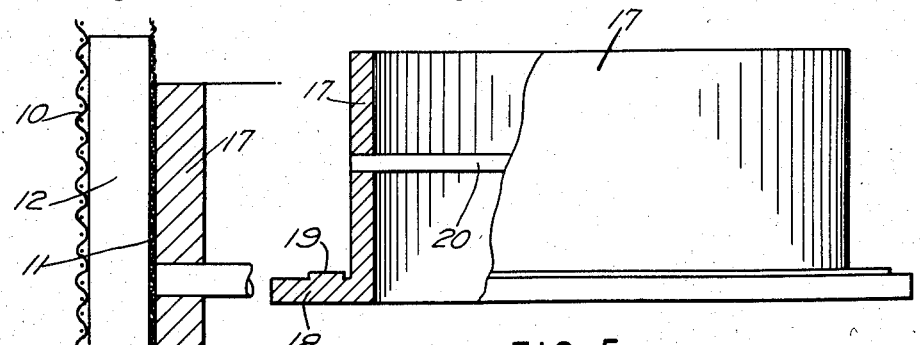
Fig. 5 is a side elevation with parts broken away of a jig used in carrying out the present method.
Figure 6:
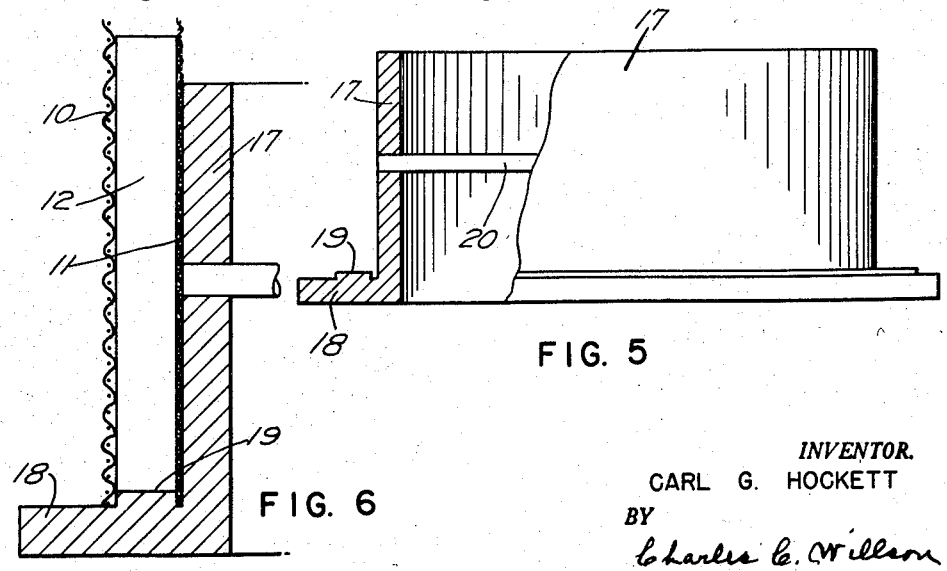

Fig. 6, on a larger scale, is a vertical sectional view through part of the jig of Fig. 5, and through the filter elements thereon.

Figure 1:
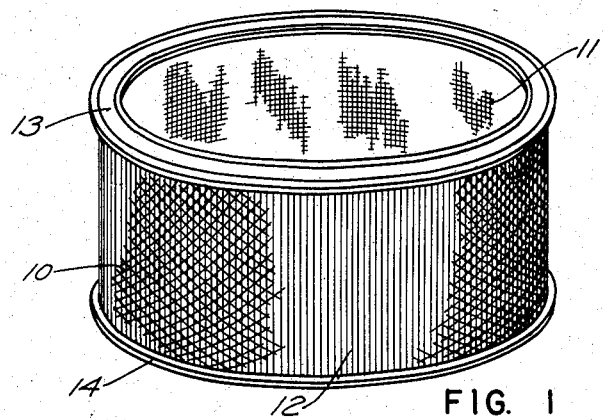
Fig. 1 is a perspective view of one type of air filter cartridge constructed by the method of the present invention.
Figure 7:
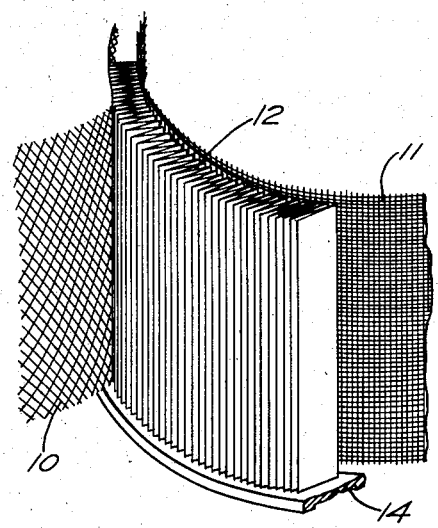

Fig. 7 is a perspective view of part of the cartridge shown in Fig. 1.

Figure 8:
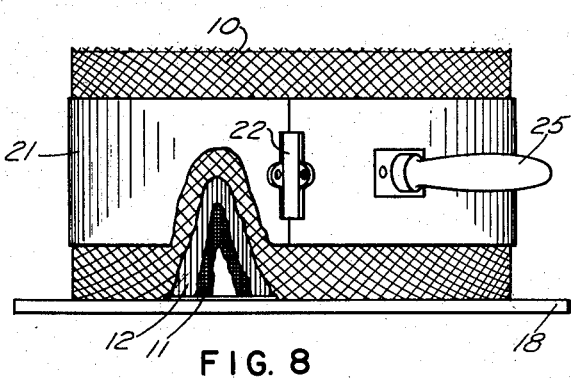

Fig. 8 is a side view, with parts broken away, showing the jig with the cartridge parts assembled thereon.

Figure 9:
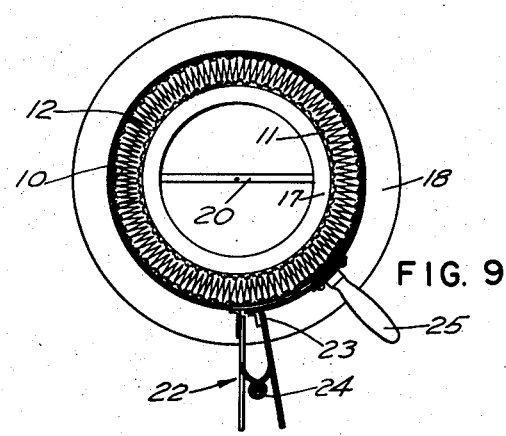

Fig. 9 is a top plan view of Fig. 8.

Figure 10:
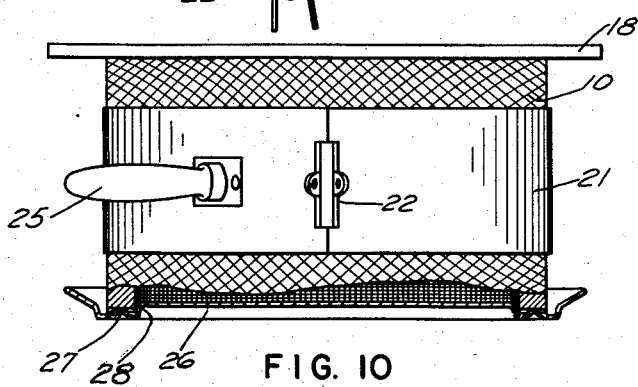

Fig. 10 is a side view with parts in section and shows the assembly of Fig. 8 turned upside down with an end of the cartridge resting in a plastic mold.

Figure 11:
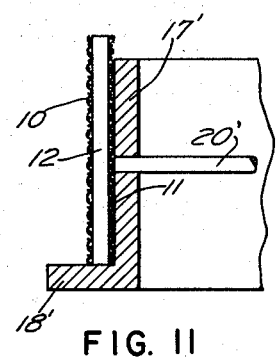

Fig. 11 is a view similar to Fig. 6, but shows as a modification, a slightly different jig.

Figure 12:
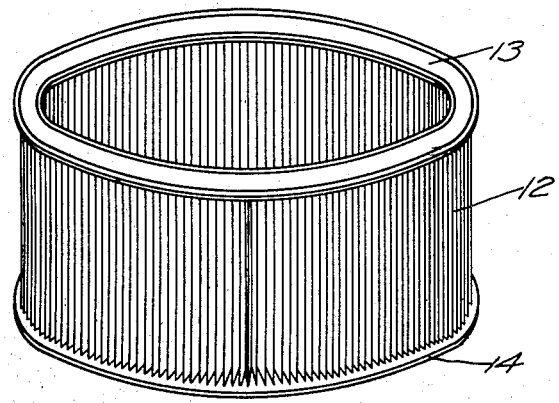

Fig. 12 is a perspective view similar to Fig. 1 and shows a filter cartridge with the outer and inner screens omitted.

Figure 13:
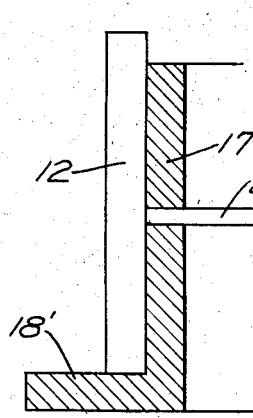

Fig. 13 is a view similar to Fig. 11 showing pleated paper with the screens omitted.

Figure 14:
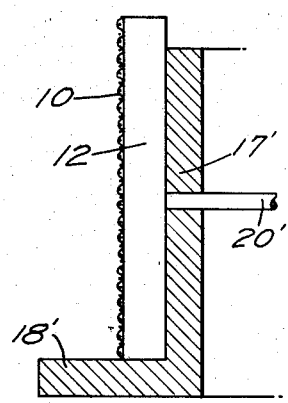

Fig. 14 is a similar view showing the pleated paper and outer screen.

Figure 15:
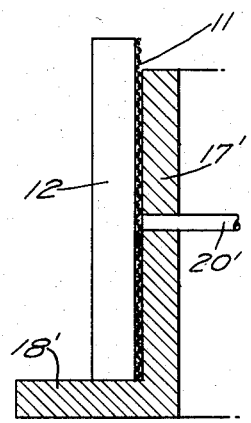

Fig. 15 is a similar view showing the pleated paper and inner screen; and

Figure 16:
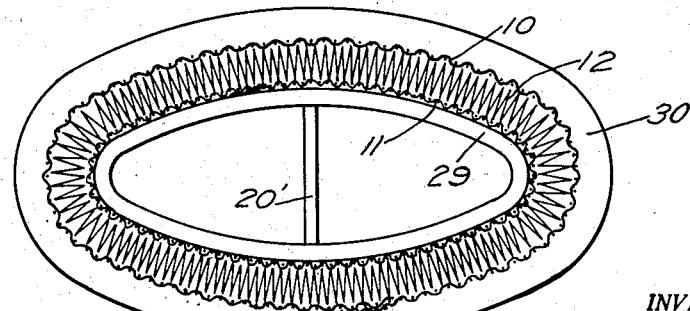

Fig. 16 is a top plan view of an elliptically shaped jig having the filter elements positioned thereupon.

The air filter cartridge shown in Fig. 1 of the drawing and which can be easily and accurately constructed by the method of the present invention, comprises an outer screen 10 which serves as a protecting outer wall, an inner screen 11 which serves as a protecting inner wall and also as a fire check adapted to protect the pleated paper filter element from fire in case the engine on which the air filter is used backfires. Between the outer screen 10 and the inner screen 11 is confined the pleated paper filter element 12 having its end pleats secured together to form the annulus shown in Fig. 2. To one end of the annular filter element so far described is secured the plastic end cap 13 and to the other end is secured a similar cap 14.

The annular air filter cartridge shown in Fig. 1 has been manufactured heretofore, but in manufacturing the same difficulty has been experienced in embedding the ends of the screens 10 and 11 in the plastic end caps so that they are concentrically immersed therein and firmly bonded to the plastic without causing the ends of such screen to grip through the plastic end cap at its outer face. Difficulty has also been experienced heretofore in producing the air filter of Fig. 1, due to the fact that if the outer screen 10 and inner screen 11 are each formed as a closed ring before the filter parts are assembled, it is difficult in mass production to produce such rings accurately to the desired dimensions, and if such dimensions vary, difficulty may be experienced in assembling the filter parts and defective filters may result.

The method of the present invention overcomes these difficulties and makes it easy to assemble the filter parts so that the pleated paper annulus 12 and screens 10 and 11, when used, will all be given the desired size in the finished product.

Figure 2:
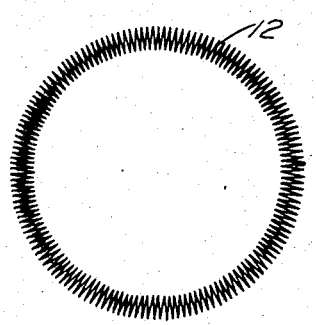
Fig. 2 is an end view of a pleated paper filter element in the form of an annulus.

In employing the present method to make the filter of Fig. 1, it is important to form the outer screen 10 so that its ends overlap as indicated by 15, but are not at this time secured together, and likewise to form the inner screen 11 so that its ends overlap as at 16 but are not secured together. The ends of the pleated paper element 12 are secured together as shown in Fig. 2, but since the diameter of this annulus may be increased as desired by merely opening the pleats, this annulus is readily given the desired diameter.

In carrying out the present invention, a rigid jig such as shown in Fig. 5 is employed and this jig is preferably made of a light metal such as aluminum. The jig comprises a cylindrical upstanding wall 17 and has a base or laterally extending flange 18 at the lower end of this cylindrical wall. This jig, as shown in Fig. 5, preferably has a raised annular rib 19 which serves a purpose to be described. Furthermore, in order to facilitate handling the jig, it may be provided with the transversely extending bar 20 which extends as a diameter across the annular body 17 of the jig and has its ends firmly secured in the jig walls.

Having described the various parts that are assembled to produce the air filter shown in Fig. 1 of the drawing, and the type of jig that is preferably employed in carrying out the method of the present invention, the manner in which this air filter is assembled in accordance with the present method will now be described.

Figure 3:
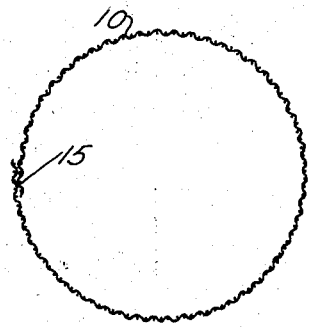
Fig. 3 is an end view of an outer screen showing its ends slidably overlapping.
Figure 4:
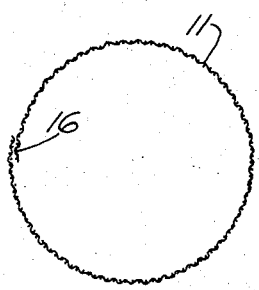
Fig. 4 is a similar view of the inner screen.

The first step in carrying out the method is to place the inner screen 11, which may be conveniently formed of woven wire having about the same size mesh as ordinary fly screen, about the vertical portion 17 of the jig shown in Fig. 5. This is readily done, since the overlapping ends 16 of this screen are free to slide, one relatively to the other, and allow the diameter of the screen to change to fit snugly about the body 17 of the jig. Next, the annular pleated filter element 12 is placed on the jig about the inner screen 11. This is easily done since this pleated element can be opened up by hand to a large enough diameter to pass freely over the screen 11. Next the outer screen 10 which is conveniently formed of relatively heavy wire having a coarser mesh than that of screen 11 may be applied. This screen is preferably cut from a large woven sheet on the bias so that the crossing wires will extend in a diagonal direction as shown in Fig. 1. This screen is placed about the annular pleated element 12, and this is easily done, since the overlapping ends 15 of the screen 10 are free to slide one relatively to the other so that the screen may be opened up to a diameter large enough to pass readily over the annular pleated paper element 12. The screens 10 and 11 are preferably bent so that they tend to assume the circular shape illustrated in Figs. 3 and 4.

As soon as the elements 10, 11 and 12 are placed upon the jig in surrounding relation to the body portion 17 thereof, they are caused to snugly embrace such body portion. This is accomplished by placing about the outer screen 12 the relatively wide clamping band 21 as shown in Fig. 8 of the drawing. The ends of this band are not permanently connected one to the other, but to one end of such band is secured a tightening element 22 which is best shown in Fig. 9, and the opposite end of the band 21 is provided with an outwardly extending shoulder 23. The arrangement is such that the clamping element 22 in the form of a spring actuated grip comprises a pair of jaws pivotally connected at 24. One of these jaws is rigidly secured to an end of the band 21 and the other jaw is adapted to be removably engaged with the shoulder 23 at the other end of such band. These two jaws are normally urged by a spring towards each other, so that when one jaw engages the shoulder 23, it will exert a continuous tightening force upon the band 21. This force will serve to contract the annular elements 10, 11 and 12 to tightly embrace the cylindrical body 17 of the jig. The clamping means 22 can be easily released by exerting pressure by the fingers on the outer ends of the clamping grip to open its jaws. To facilitate movement of the clamping band 21 to and from the clamping position about the jig, a handle 25 is preferably secured to such band near the end thereof that is provided with the shoulder 23. This handle and the clamping grip 22 together serve as handles that make it easy to move the clamping band to and from its operating position.

After the annular elements 10, 11 and 12 have been placed upon the jig, as just described, and the clamping band 21 has been secured about these elements, care should be taken to see that each of the annular elements is forced downwardly into firm contact with the flange 18 of the jig, so as to dispose the lower end of these three annular elements in proper relation to each other, as shown for example in Fig. 6. When the cartridge parts are properly assembled on the jig, they should extend upwardly some distance above the upper end of the jig as shown in Fig. 6.

In many cases, it is found desirable to give the outer screen 10 and inner screen 11 a slightly greater height than the pleated element 12 as shown for example in Fig. 6 of the drawing. When this construction is employed, the annular rib 19 should extend upwardly from the face of the flange 18 one-half the distance by which the screens 10 and 11 exceed the height of the pleated element 12. When the annular rib 19 is so constructed, it will accurately center the ends of the annular element 12 with respect to the ends of the screens 10 and 11 as will be apparent from Fig. 6. Once these annular elements are so positioned with respect to each other about the jig, they will be retained in this position by the clamping action of the embracing band 21.

When the annular elements 10, 11 and 12 are placed upon the jig in snugly embracing relation with the body portion 17 thereof, and are forced downwardly against the flange 18 to properly position the lower end of each of these annular elements, the assembled parts are ready to have a plastic sealing cap bonded thereto. This is accomplished as best shown in Fig. 10 of the drawing by providing a molding pan 26 conveniently formed of relatively thin sheet metal which is provided with an annular groove of the size and shape it is desired to impart to the end cap 13 or 14. Within the mold 26 is placed the desired amount of plastic in the form of a viscious fluid. Then the jig shown in Fig. 8, with the parts held in place by the band 21, is picked up by hand and turned end for end as shown in Fig. 10 so that the exposed end shown in Fig. 8 is immersed in the plastic confined in the mold pan 26 of Fig. 10. This mold pan is preferably provided with an upstanding rib 27 which forms a seat upon which the zigzag end of the paper element 12 may rest. This rib 27 should be high enough to hold the lower end of the screen 10 and screen 11 slightly spaced from the bottom of the mold pan 26, so that these wire screens will be completely immersed in the plastic within the pan 26, and will not lie close enough to the bottom of the pan to grin through the plastic after it is heat set. The pan 26 has an inclined shoulder 28 adapted to be engaged by the inner screen 11 to center this pan.

After the parts are placed in the position shown in Fig. 10, so that the lower ends of the annular elements 10, 11 and 12 are immersed in the plastic confined in the pan 26, sufficient heat is applied to the pan to set the plastic, such for example as plastisol to convert the same into a strong, tough, durable sealing cap 13 or 14. As soon as this plastic has been heat set, or as soon as the plastic has jelled, the jig 17—18 may be removed from the cartridge assembly without disturbing the band 21. Such assembly may now be provided with a closure cap at the other end thereof by employing another and similar mold pan containing the desired amount of plastic in a viscous condition. The parts shown in Fig. 10, but with the jig removed, are now turned upside down and immersed in the plastic confined in the second mold pan. After this plastic has jelled or been heat set, the work of producing the filter element contemplated by the present invention is completed, except for removing the clamping band 21 from the outer screen 10, and stripping the molding pans from the cured plastic cap 13 and 14. After the end caps 13 and 14 are formed and cured, they will hold the overlapping ends of the screens 10 and 11 firmly in place.

In some cases, it may be desirable to form the filter element so that the height of the pleated paper 12 is the same as the height of the screens 10 and 11. In this case, a jig such as shown in the modified construction of Fig. 11 may be employed. This jig which has a cylindrical body portion 17' and laterally extending flange 18' is similar to that shown in Fig. 5, except that the raised rib 19 is not employed in the construction shown in Fig. 11. The procedure in using the jig of Fig. 11 is the same as that above described with the exception that the screens 10 and 11, and pleated paper 12, all rest upon the flat flange 18'.

The primary advantage secured by employing the above described jig results from the fact that it will determine the diameter of the filter element 12 and screens 10 and 11 and will cause them to lie snugly and concentrically one about the other; and also center the mold pan so that the end caps 13 and 14 will be concentrically disposed relatively to the filter element. These advantages are secured even if one or both of the screens 10 and 11 are omitted, for the jig may be used to hold the annular filter element 12 in the desired annular shape while the caps 13 and 14 are secured thereto, whether or not the screens 10 and 11 are used.

Fig. 12 shows in perspective a pleated air filter formed of the annual pleated paper element 12 and the end caps 13 and 14, the screens 10 and 11 being omitted.

Fig. 13 shows in section the jig 17' with only the pleated paper 12 thereon. Fig. 14 is a similar view showing the jig 17' with the pleated paper 12 and outer screen 10 thereon. Fig. 15 is a similar view showing the jig 17' with the pleated paper 12 and inner screen 11 thereon. When the inner screen 11 is omitted, the inside diameter of the annual filter element 12 will be that of the body 17'. As a result, it will contact the shoulder 28 of the pan to center the pan with respect to the filter element. This jig may be lifted by engaging the transverse bar 20'.

In some cases, it may be desirable to produce pleated air filters which are elliptical in shape as shown in Fig. 16 rather than round as shown in the other views. The above described method is well adapted to produce such elliptical filter elements. To accomplish this, the screens 10 and 11 and pleated filter element 12, shown in Figs. 2, 3 and 4, may be used. In this case these filter elements are placed around the jig or Fig. 16 having the upstanding elliptical body 29 and lateral flange or base 30, and are held tightly about such body by a surrounding band, not shown. The molds for the end caps will also be elliptical in shape.

It will be seen from the foregoing that by practicing the method of the present invention, all parts of the filter element will be accurately positioned in concentric relation one with the other, and that the present method may be used whether or not the screens 10 and 11 are employed, and whether or not the finished filter element is round or elliptical in shape.

Having thus described my invention, what I claim and desire to protect by Letters Patent is:

1. In the manufacture of approximately annular pleated filters having the zigzag ends of the pleated material embedded in plastic end caps; the method of assembling such a filter which comprises placing an inner screen having the form of an open ring about a jig having a laterally extending base and an approximately cylindrical body so that the ends of the screen slidably overlap, placing a pleated filter material with its end pleats secured together on the jig about said screen, placing an outer screen having the form of an open ring on said jig about the pleated material so that its ends slidably overlap, forcing the two screens and pleated material against the base, then tightening a band about the screens and pleated material to cause them to hug the body of the jig, and while they are so held about the jig, immersing an edge of each screen and the zigzag ends of the pleats in a plastic that is confined in a mold.

2. In the manufacture of an air filter cartridge having a filter element formed of pleated paper in the form of an approximate annulus and end caps at the ends of the pleated filter element; the method of assembling such a filter which comprises placing an inner screen having the form of an open ring about a jig having an approximately cylindrical body so that the ends of this screen slidably overlap, placing a filter element of pleated paper having its end pleats secured together on the jig about said screen, placing an outer screen having the form of an open ring on said jig about the pleated paper so that its ends slidably overlap, tightening a band about the screens and pleated paper to cause them to hug the body of the jig, forcing the ends of the screens and pleated paper against a base flange of the jig to position one end relatively to another, and bonding an end cap to the pleated paper and screens.

3. In the manufacture of an air filter cartridge having a filter element formed of pleated paper in the form of an approximate annulus and end caps at the ends of the pleated filter element; the method of assembling such a filter which comprises placing an inner screen having the form of an open ring about a jig having an approximately cylindrical body so that the ends of this screen slidably overlap, placing a filter element of pleated paper having its end pleats secured together on the jig about said screen, placing an outer screen having the form of an open ring on said jig about the pleated paper so that its ends slidably overlap, tightening a band about the screens and pleated paper to cause them to hug the body of the jig, forcing the ends of the screens and pleated paper against a base flange of the jig to position one end relatively to another, and while they are held by the band about the jig, immersing said ends in a plastic contained in a mold that has a raised rib adapted to hold said ends spaced from the mold bottom.

4. In the manufacture of an air filter cartridge having a filter element formed of pleated paper in the form of an approximate annulus and end caps at the ends of the pleated filter element; the method of assembling such a filter which comprises placing an inner screen having the form of an open ring about a jig having a laterally extending base and an approximately cylindrical body so that the ends of this screen slidably overlap, placing a filter element of pleated paper having its end pleats secured together on the jig about said screen, placing an outer screen having the form of an open ring on said jig about the pleated paper so that its ends slidably overlap, forcing the two screens and pleated material against the base, then tightening a band about the screens and pleated paper to cause them to hug the body of the jig, and while they are so held by the band about the jig, immersing said ends in a plastic contained in a mold so that the inner screen engages a wall of the mold and centers the mold relatively to this wall.

5. In the manufacture of approximately annular porous pleated filters having the zigzag ends of the pleated sheet material embedded in plastic end caps; the method of assembling such a filter which comprises placing about a jig having a laterally extending base and an approximately cylindrical body an inner screen having the form of an open ring so that its ends slidably overlap, then placing a pleated filter material with its end pleats secured together about the screen, forcing the screen and pleated material against the base, then tightening a band about the pleated material to cause it and the screen to hug the body of the jig, and while the pleated material and screen are so held by the band, immersing an end of the zigzag pleats and screen in a plastic that is confined in a mold and causing the plastic to bond to the pleats and screen.

6. In the manufacture of approximately annular porus pleated filters having the zigzag ends of the pleated sheet material embedded in plastic end caps; the method of assembling such a filter which comprises placing about a jig having a laterally extending base and an approximately cylindrical body a pleated filter material with its end pleats secured together, placing an outer screen having the form of an open ring on said jig about the pleated material so that its ends slidably overlap, forcing the screen and pleated material against the base, then tightening a band about said screen to cause it and the pleated material to hug said body, and while the screen and pleated material are so held by the band, immersing an end of the screen and pleated material in a plastic that is confined in a mold and causing the plastic to bond to the screen and pleats.

References Cited in the file of this patent

UNITED STATES PATENTS

| 726,965 | Miller et al. | May 5, 1903 |
| 1,284,553 | Apple | Nov. 12, 1918 |
| 2,261,416 | Schrier | Nov. 4, 1941 |
| 2,432,137 | Burke | Dec. 9, 1947 |
| 2,512,797 | Harvuot | June 27, 1950 |
| 2,549,810 | Hervey et al. | Apr. 24, 1951 |
| 2,732,031 | Rabbitt et al. | Jan. 24, 1956 |
| 2,749,265 | Fricke et al. | June 5, 1956 |
| 2,771,156 | Kasten et al. | Nov. 20, 1956 |

FOREIGN PATENTS

| 680,211 | Great Britain | Oct. 1, 1952 |